(12) United States Patent
Beiderbeck et al.

(10) Patent No.: US 11,305,776 B2
(45) Date of Patent: Apr. 19, 2022

(54) METHOD FOR OPERATING A DRIVER ASSISTANCE APPARATUS OF A MOTOR VEHICLE, DRIVER ASSISTANCE APPARATUS AND MOTOR VEHICLE

(71) Applicant: Continental Automotive GmbH, Hannover (DE)

(72) Inventors: Martin Beiderbeck, Parsberg (DE); Franz Pellkofer, Nittendorf (DE); Friedrich Graf, Sinzing (DE)

(73) Assignee: Continental Automotive GmbH

( * ) Notice: Subject to any disclaimer, the term of this patent is extended or adjusted under 35 U.S.C. 154(b) by 217 days.

(21) Appl. No.: 16/612,567

(22) PCT Filed: Apr. 27, 2018

(86) PCT No.: PCT/EP2018/060970
§ 371 (c)(1),
(2) Date: Nov. 11, 2019

(87) PCT Pub. No.: WO2018/210555
PCT Pub. Date: Nov. 22, 2018

(65) Prior Publication Data
US 2020/0164882 A1 May 28, 2020

(30) Foreign Application Priority Data
May 15, 2017 (DE) .................... 10 2017 208 159.7

(51) Int. Cl.
*B60W 30/18* (2012.01)
*B60W 40/09* (2012.01)
(Continued)

(52) U.S. Cl.
CPC ...... *B60W 30/18163* (2013.01); *B60W 40/09* (2013.01); *G08G 1/0112* (2013.01);
(Continued)

(58) Field of Classification Search
CPC ............ B60W 30/18163; B60W 40/09; G08G 1/0112; G08G 1/0129; G08G 1/167
See application file for complete search history.

(56) References Cited

U.S. PATENT DOCUMENTS 8,260,515 B2   9/2012   Huang et al.
8,543,310 B2   9/2013   Kashi et al.
(Continued)

FOREIGN PATENT DOCUMENTS

CN    1986306 A     6/2007
CN    102806911 A   12/2012
(Continued)

OTHER PUBLICATIONS

International Search Report and Written Opinion for International Application No. PCT/EP2018/060970, dated Aug. 1, 2018, 15 pages.

(Continued)

*Primary Examiner* — Peter D Nolan
*Assistant Examiner* — Wae L Louie
(74) *Attorney, Agent, or Firm* — RatnerPrestia

(57) ABSTRACT

A method for operating a motor vehicle driver assistance apparatus, includes: capturing sensor data of a surrounding area of the motor vehicle in which at least one target vehicle is situated, the target vehicle being in front of and in the same lane as the motor vehicle; capturing at least one driver characteristic describing a driver of the motor vehicle; assigning the driver to a predetermined driver class based on the driver characteristic; reading in driver-class-specific overtaking information, describing an overtaking tendency of the driver, based on the driver class associated with the overtaking information; outputting a control signal of the driver assistance apparatus, which rates an overtaking maneuver of the motor vehicle in regard to the target vehicle, (Continued)

from a plurality of reference control signals having associated overtaking information based on the overtaking information and the sensor data; and outputting the control signal by the driver assistance apparatus.

15 Claims, 4 Drawing Sheets

(51) Int. Cl.
G08G 1/01 (2006.01)
G08G 1/16 (2006.01)
(52) U.S. Cl.
CPC ........... *G08G 1/0129* (2013.01); *G08G 1/167* (2013.01); *B60W 2520/10* (2013.01); *B60W 2540/21* (2020.02); *B60W 2540/22* (2013.01); *B60W 2540/30* (2013.01); *B60W 2554/802* (2020.02); *B60W 2555/20* (2020.02)

(56) References Cited

U.S. PATENT DOCUMENTS

| | | | |
|---|---|---|---|
| 9,483,947 B2 | 11/2016 | Strassberger | |
| 9,809,164 B2 | 11/2017 | Matsuno et al. | |
| 9,862,272 B2 | 1/2018 | Schuberth et al. | |
| 9,983,013 B1* | 5/2018 | Krunic | G01C 21/3697 |
| 10,150,476 B2* | 12/2018 | Norwood | B60W 30/14 |
| 10,298,735 B2* | 5/2019 | Preston | G06F 9/46 |
| 10,392,012 B2* | 8/2019 | Tannenbaum | B60W 10/20 |
| 10,860,028 B2* | 12/2020 | Kato | G08G 1/167 |
| 2014/0032087 A1* | 1/2014 | Shiri | G01C 21/3469 701/117 |
| 2014/0279707 A1* | 9/2014 | Joshua | G06Q 30/0283 705/400 |
| 2014/0310788 A1* | 10/2014 | Ricci | G06F 21/31 726/6 |
| 2014/0371981 A1 | 12/2014 | Nordbruch et al. | |
| 2016/0264147 A1 | 9/2016 | Mueller et al. | |
| 2016/0300242 A1* | 10/2016 | Truong | G10L 17/22 |
| 2016/0363935 A1* | 12/2016 | Shuster | G08G 1/163 |
| 2018/0222478 A1 | 8/2018 | Limbacher | |
| 2020/0207358 A1* | 7/2020 | Katz | G06F 3/017 |
| 2021/0269045 A1* | 9/2021 | Katz | B60W 40/08 |

FOREIGN PATENT DOCUMENTS

| | | |
|---|---|---|
| CN | 103702883 A | 4/2014 |
| CN | 105172792 A | 12/2015 |
| CN | 105730323 A | 7/2016 |
| DE | 4437678 A1 | 5/1996 |
| DE | 19843395 A1 | 3/2000 |
| DE | 102005014803 A1 | 10/2006 |
| DE | 102009034096 A1 | 9/2010 |
| DE | 102010004625 A1 | 7/2011 |
| DE | 102012216422 A1 | 3/2014 |
| DE | 19725656 B4 | 11/2014 |
| DE | 202013010566 U1 | 2/2015 |
| DE | 102013217434 A1 | 3/2015 |
| DE | 102015010292 B3 | 1/2017 |
| EP | 2293255 A1 | 3/2011 |
| EP | 2813408 A1 | 12/2014 |
| JP | 2006120268 A | 5/2006 |
| JP | 2006293530 A | 10/2006 |
| JP | 2012093969 A | 5/2012 |
| JP | 2014157408 A | 8/2014 |

OTHER PUBLICATIONS

German Examination Report for German Application No. 10 2017 208 159.7, dated Nov. 30, 2017, 6 pages.
Japanese Notice of Reasons for Refusal for Japanese Application No. 2019-563206, dated April. 5, 2021 with translation, 10 pages.
Korean Notice to Submit Response for Korean Application No. 10-2019-7036891, dated Oct. 29, 2020 with translation, 12 pages.
Chinese Office Action for Chinese Application No. 201880047245. 6, dated Jun. 23, 2021 with translation, 17 pages.
Japanese Decision to Grant a Patent for Japanese Application No. 2019-563206, dated Dec. 22, 2021, with translation, 5 pages.

* cited by examiner

METHOD FOR OPERATING A DRIVER ASSISTANCE APPARATUS OF A MOTOR VEHICLE, DRIVER ASSISTANCE APPARATUS AND MOTOR VEHICLE

CROSS REFERENCE TO RELATED APPLICATIONS

This application is the U.S. National Phase Application of PCT International Application No. PCT/EP2018/060970, filed Apr. 27, 2018, which claims priority to German Patent Application No. 10 2017 208 159.7, filed May 15, 2017, the contents of such applications being incorporated by reference herein.

FIELD OF THE INVENTION

The invention relates to a method for operating a driver assistance apparatus of a motor vehicle. The proposed approach involves sensor data from a surrounding area of the motor vehicle being captured. At least one target vehicle is situated in the surrounding area. The target vehicle is in front of the motor vehicle and in the same lane as the motor vehicle. Furthermore, the invention relates to a driver assistance apparatus having an evaluation unit designed to carry out a corresponding method. The invention also relates to a motor vehicle having a corresponding driver assistance apparatus.

BACKGROUND OF THE INVENTION

Methods for operating a driver assistance apparatus of a motor vehicle are known from the prior art. As such, it is known for example that a future overtaking route of a motor vehicle is calculated on the basis of ambient sensor data or map data, and the overtaking route or advice based thereon is output in order to assist a driver in an overtaking maneuver.

SUMMARY OF THE INVENTION

An aspect of the present invention is a method, a driver assistance apparatus and a motor vehicle that allow an overtaking maneuver of the motor vehicle to be performed more safely.

A method according to an aspect of the invention involves a driver assistance apparatus of a motor vehicle being operated. The following steps are performed:
  capturing sensor data of a surrounding area of the motor vehicle in which at least one target vehicle is situated, said target vehicle being in front of the motor vehicle, in particular in the direction of travel of the motor vehicle, and being in the same lane as the motor vehicle; with the important concept of
  capturing at least one driver characteristic describing a driver of the motor vehicle;
  assigning the driver to a determined driver class on the basis of the driver characteristic;
  reading in driver-class-specific overtaking information, describing an overtaking tendency of the driver, on the basis of the driver class associated with the overtaking information;
  selecting a control signal of the driver assistance apparatus, which control signal rates an overtaking maneuver of the motor vehicle in regard to the target vehicle, from a plurality of reference control signals having associated overtaking information on the basis of the overtaking information and the sensor data; and
  outputting the control signal by means of the driver assistance apparatus.

An aspect of the invention is based on the insight that the overtaking maneuver can be performed more safely as a result of the driver-class-specific overtaking information, i.e. as a result of taking into consideration the individual driving of the driver.

In particular, the overtaking information is available in different ways for the different driver classes. The overtaking information describes the overtaking tendency of the driver or his/her driving tendency during overtaking maneuvers. The driver is in turn assigned to the driver class. The driver class can include for example only the driver or else multiple drivers and hence serve as a generalization for the overtaking information for overtaking tendencies of multiple drivers.

The overtaking information can be available as a, in particular unitless, numerical vector or a, in particular unitless, numerical matrix having one or more dimensions. The overtaking information is then compared with the overtaking information associated with the reference control signals. In particular the reference control signal having the most similar overtaking information is selected.

From the overtaking information, it is known how and with what driving the driver operates the motor vehicle during an overtaking maneuver, that is to say what overtaking tendency the driver has. This preference for the operation of the motor vehicle can be mapped numerically on the basis of properties described below. These properties, which can also be represented numerically, because they are denoted by parameters or values of states of components of the motor vehicle, are taken as a basis for the machine learning for producing the overtaking information. The overtaking information can be available in particular as a classifier for selecting the control signal.

As a result of the overtaking information of the reference control signals, there are in particular different classes available to which the driver is assigned on the basis of the comparison. In particular, each class provides a different control signal. As such, one class provides for example the control signal for overtaking with maximum possible acceleration, while another class provides for example the control signal involving overtaking with only half the maximum possible acceleration.

The surrounding area of the motor vehicle is captured and the sensor data are provided. The surrounding area can be captured for example using a wide variety of ambient sensors of the motor vehicle, for example a camera, a radar sensor, a lidar sensor, a laser scanner, an ultrasonic sensor or a combination of these sensors.

In front of the motor vehicle there is the target vehicle. The motor vehicle thus drives toward the target vehicle. The motor vehicle is in the same lane as the target vehicle, which means that the motor vehicle needs to overtake the target vehicle in order to pass the target vehicle at a higher speed than the target vehicle. In this context, the surrounding area is captured.

A characteristic describing the driver of the motor vehicle is captured from the driver. The driver characteristic can be captured for example by an interior camera of the motor vehicle, an RFID (radio-frequency identification) chip in the vehicle key or a fingerprint reader. The driver characteristic can therefore be a characteristic that preferably uniquely identifies the driver.

The driver characteristic assigns the driver to the predetermined driver class. This is done in particular on the basis of mapping of the driver characteristic onto the driver class. The driver class can also have only the driver alone and does not necessarily have to contain multiple drivers.

The associated driver class has the associated overtaking information. The overtaking information describes the overtaking tendencies of the driver or the overtaking tendencies of the driver class to which the driver is assigned. The overtaking information is preferably different from driver class to driver class. As such, one driver class can have for example higher-risk drivers in regard to an overtaking maneuver, while another driver class has less high-risk drivers. The overtaking information is read for example from a memory of the motor vehicle or of a vehicle-external device.

The overtaking information and the sensor data are taken as a basis for selecting the control signal of the driver assistance apparatus. The control signal rates the overtaking maneuver of the motor vehicle in regard to the target vehicle. Rating means that for example a risk or a risk probability is determined for the overtaking maneuver. However, rating can also mean that it is determined whether the overtaking maneuver can be performed safely or whether the overtaking maneuver cannot be performed safely. The rating can be performed for example using methods of data analysis, data processing, data transformation, data modelling and also using methods of machine learning and artificial intelligence, for example neural networks, SVM (support vector machine) methods, deep learning, KNN (k-nearest-neighbor), regression or the like.

The control signal is output by the driver assistance apparatus. The control signal allows for example visual and/or audible and/or haptic advice to be triggered. The control signal alternatively allows an at least semi-autonomously or humanly performed overtaking maneuver of the motor vehicle to be triggered. In this context, at least semi-autonomously means that the steering of the motor vehicle and/or the acceleration of the motor vehicle is/are effected automatically, i.e. substantially without the intervention of a human driver. Preferably there is provision for the overtaking information to be produced on the basis of training data, with at least one of the following properties that characterize the driver. The training data thus have at least one of the properties. As such, the property can be available for example as a speed of travel relative to the mandatory speed, as a safety distance when pulling back in after an effected overtaking maneuver or as a distance from the target vehicle when pulling out before an effected overtaking maneuver.

The property can in particular also be available by virtue of a pulling-out angle of the motor vehicle at the beginning of the overtaking maneuver, however. The pulling-out angle describes the angle with respect to the lane longitudinal axis at which the motor vehicle carries out the lateral movement in regard to the lane at the start of the overtaking maneuver. However, the property provided for can for example also be a pulling-in angle, an acceleration profile, a utilization level of the power reserve of the motor vehicle, a distance behavior in regard to the target vehicle before the overtaking maneuver or at the beginning of the overtaking maneuver, an acceleration behavior, a shifting behavior, a braking behavior, an approach speed behavior in regard to the target vehicle. The mandatory speed in this case can be available as a recommended speed or as a legal speed limit, for example. The overtaking information is then produced for example by means of machine learning with the training data. The overtaking information is then assigned to a driver class or else the driver class is created by the respective overtaking information. The speed of travel relative to the mandatory speed thus allows a statement to be made about whether the driver exceeds the mandatory speed during the overtaking maneuver, for example briefly, in order to overtake the target vehicle. The control signal is then selected on the basis of the tendencies of the driver.

The control signal can alternatively be selected according to whether the driver would like to have a large safety distance when pulling back in after an effected overtaking maneuver or a shorter safety distance in relation to the target vehicle after an effected overtaking maneuver. That is to say whether the safety distance is above or below a distance limit value. The distance can be available in the unit m, for example. As such, some drivers like to pull back in with a large safety distance, that is to say for example several vehicle lengths in front of the target vehicle, and it is enough for other drivers if the safety distance is the length of one vehicle, for example. In the first case, the driver is then assigned to a first class of overtaking tendencies, for example, and to a second class in the second case. In the first class, there is preferably a first reference control signal, and in the second class, there is preferably a second reference control signal, which is different than the first reference control signal.

The pulling-out distance in relation to the target vehicle can also be available as the property. The pulling-out distance in relation to the target vehicle specifies how far in front of the target vehicle the motor vehicle leaves the lane to the side or with an at least partially lateral movement.

The acceleration profile can also be used as a property. The acceleration profile describes the acceleration values with which the motor vehicle is operated in the different phases of the overtaking maneuver. As such, the motor vehicle can be accelerated more powerfully at the beginning of the overtaking maneuver than at the end of the overtaking maneuver, for example, or vice versa, or else the motor vehicle is accelerated powerfully just in the middle of the overtaking maneuver, whereas it is accelerated merely to a lesser degree than in the middle phase at the start of the overtaking maneuver and at the end of the overtaking maneuver.

The property available can also be the acceleration behavior. The acceleration behavior can describe how the driver accelerates the motor vehicle, for example. As such, the accelerator pedal can be pushed down completely or else pushed down only partially, for example. This is consistent with different utilization levels of the power reserve. By way of example, it is also possible to shift down at least one gear at the beginning of the overtaking maneuver in order to achieve a higher engine speed range. It is thus also possible for a shifting behavior to be available as the property. As such, shifting to a lower gear before the beginning of or during the overtaking maneuver can be assigned to a first class, for example, whereas maintaining the gear before or during the overtaking maneuver is assigned to a second class. Producing the overtaking information on the basis of the training data with the properties allows the driver assistance apparatus to be operated more safely.

Furthermore, there is preferably provision for the overtaking information to be produced on the basis of a current weather condition and/or a current time of day and/or a current day of the week. Preferably, the overtaking information can also be produced on the basis of a current traffic density and/or a current road category. The current weather condition can involve for example prescribing whether it is raining, whether it is snowing, what the outside temperatures are, and then again what the overtaking tendency of the driver is on the basis of the weather condition. As such, there are for example drivers who overtake less often when the road is wet or else when the road is icy than they would do if the road were dry and/or unfrozen.

Furthermore, the overtaking information can be produced or trained on the basis of the current time of day, for example. As such, there are for example drivers who, early in the morning on their way to work and/or in the evening on their way home from work, drive more riskily and therefore overtake more often than is the case during working hours, for example. The opposite case may also arise, for example, so that overtaking is effected more often during working hours, as important appointments then need to be kept. There may also be provision for the overtaking information to be produced on the basis of the current day of the week. As such, it may be that the driver overtakes more often on workdays, for example, than he/she does on holidays or on non-workdays. The density of traffic or the volume of traffic can also be used as the property for producing the overtaking information. As such, there are for example drivers who overtake only when the volume of traffic is low, since the overtaking situation is then usually more transparent. The opposite may also be the case, however, so that specifically when the volume of traffic is high there are attempts to get to the destination more quickly by overtaking. The overtaking information can also be produced with the road category as the property. The road category classifies the road within a road network in terms of road construction, design standard or restriction on use. As such, a driver overtakes in a different manner on highways, for example, than he/she overtakes on rural or municipal roads.

Furthermore, there is preferably provision for a current operating parameter of the motor vehicle to be captured and for the operating parameter and the overtaking information to be used to recognize an intention of the driver to overtake, and for the control signal to be selected on the basis of the recognized intention to overtake. The operating parameter can be concordant with the properties of the training data, for example. As such, for example the operating parameter allows a determined distance behavior or a determined acceleration behavior to be captured that has a level of similarity with the overtaking information. To this end, the operating parameter can be compared with the overtaking information and then for example categorized as similar or dissimilar on the basis of the comparison. If the operating parameter is assessed as similar to the overtaking information, this then allows the inference that the driver intends to overtake, for example. On the basis of the recognized intention to overtake, for example the control signal allows advice to be output to the driver indicating that the overtaking maneuver would be possible with less risk at a specific distance or else that the present overtaking opportunity should be taken because there is no overtaking opportunity at all in the next journey section.

Further, there is preferably provision for a currently physiologically recognizable identifier of the driver to be captured and for the identifier to be compared with a plurality of reference identifiers, wherein the comparison is used to recognize an intention of the driver to overtake. The physiologically recognizable identifier describes a behavior relating to the body of the driver. As such, it may be for example that the driver usually grips a steering wheel of the motor vehicle tighter before an overtaking maneuver than he/she would do without the intention to overtake. Alternatively, it may be for example that the driver blinks more frequently when there is the intention to overtake than he/she would do without the intention to overtake. By recognizing the intention to overtake, it is in turn possible for the control signal to be selected accordingly and the motor vehicle can be operated more safely. Furthermore, there is preferably provision for the currently physiologically recognizable identifier captured to be a degree of nervousness and/or an eye movement and/or a volume of a sound uttered by the driver and/or a semantic meaning of a sound uttered by the driver. The degree of nervousness can be determined for example on the basis of the appearance of sweat on the forehead of the driver or else sweaty areas on the palms of the driver. The appearance of sweat can be captured for example by means of sensors of the motor vehicle, for example a camera. The sound uttered by the driver can be for example a remark or else a blow on an item in the motor vehicle. If the sound is a remark by the driver, then for example the semantic meaning of the remark can be captured by a voice recognition program. If the driver shouts or swears, for example, then this can be graded as an indication of the intention to overtake, for example. This is advantageous because the control signal can in turn be selected on the basis of the intention to overtake. As such, for example a warning can be output to the driver if the intention to overtake is recognized but overtaking is not possible in consideration of his/her overtaking tendency. This in turn allows the motor vehicle to be operated more safely.

Furthermore, there is preferably provision for the sensor data and the overtaking information and/or the physiologically recognizable identifier to be taken as a basis for determining an individual overtaking route for the overtaking maneuver in regard to the target vehicle. As such, it may be for example that it is known from the overtaking information that the driver usually overtakes in leisurely fashion and in so doing does not utilize the power reserves of the motor vehicle. As such, the driver may then not be provided with advice of an imminent overtaking opportunity if utilization of the power reserve is a prerequisite for the success of the overtaking maneuver in this case, for example. For a driver who utilizes the power reserves of the motor vehicle and is fundamentally more risk-inclined, the overtaking proposal can be output in this case, however.

It may also be for example that the physiologically recognizable identifier is used to recognize that the driver is in a state that is either particularly relaxed, and therefore a slow overtaking maneuver is more likely to be assumed, or else the driver is particularly tense and excited, which is why an overtaking proposal is not output to the driver, since the driver is currently not considered capable of a measured approach. This in turn thus allows the motor vehicle to be operated more safely.

Furthermore, there is preferably provision for the overtaking information to be adapted on the basis of current vehicle driving by the driver, in particular by means of online training, during operation of the motor vehicle. As such, the current vehicle driving by the driver, which in particular also includes the operating parameters of the motor vehicle, is captured and the overtaking information is adapted. The current vehicle driving by the driver can then for example also be described using the properties of the training data used for producing the overtaking information. For the purpose of adapting the overtaking information, the overtaking information can be continually kept up to date and precise. As such, the overtaking tendency of a driver can change over the course of time, for example. For example the driver can become older and therefore also more relaxed or else less risk-inclined in specific overtaking situations.

The adapting of the overtaking information during the operation of the motor vehicle also allows merely slightly adapted, initially available overtaking information to be used for starting. The method can thus also be performed with little initially available training data, since the overtaking information is adapted and therefore improved constantly, during the operation of the motor vehicle. Online training describes a method of machine learning in which a classifier is adapted during operative service. The classifier is thus trained using training examples that it has previously assigned to the classes itself. Initial training data, on the other hand, are usually assigned to the classes manually, that is to say by human beings.

Furthermore, there is preferably provision for the overtaking information adapted during operation of the motor vehicle to be transferred to at least one motor-vehicle-external device. The motor-vehicle-external device can be in the form of an external server or else multiple external servers, for example. The adapted overtaking information can thus be transferred to what is known as a computer cloud, that is to say to a distributed computer network, for example. The device can be available in stationary, distributed or central fashion in this case. The transfer of the adapted overtaking information to the device allows it to be sent in turn to further motor vehicles. A model on which the overtaking information is based can also be adapted by means of the adapted overtaking information. This is also advantageous as a data backup of the overtaking information. As such, the overtaking information can be erased from a memory of the motor vehicle, for example, or else be absent in a new car in the first place and restored by means of the data backup of the overtaking information.

Furthermore, there is preferably provision for the control signal to be used by the driver assistance apparatus to output overtaking opportunity advice or a warning of the overtaking maneuver of the motor vehicle in regard to the target vehicle. The overtaking opportunity advice allows for example visual and/or audible and/or haptic advice that the overtaking maneuver is possible to be output to the driver of the motor vehicle. The warning provides the driver of the motor vehicle with an output, for example also visually and/or audibly and/or haptically, indicating that the overtaking maneuver is for example currently not performable for a specific stretch or a specific period of time or else is performable only such that the overtaking maneuver would proceed in a manner inconsistent with the overtaking tendencies of the driver, that is to say for example acceleration would be too quick or else pulling in would be too close in front of the target vehicle. The overtaking opportunity advice and/or the warning allow(s) the motor vehicle to be operated more safely because the driver is not put into an unfamiliar or unpleasant situation.

Furthermore, there is preferably provision for the overtaking maneuver of the motor vehicle in regard to the target vehicle to be performed at least semi-autonomously on the basis of the control signal. The semi-autonomous overtaking allows for example a steering intervention and/or an acceleration or braking intervention to take place. The driver of the motor vehicle is thus moved in the motor vehicle, even in the case of at least semi-autonomous overtaking, such that his/her overtaking tendency is taken into consideration. The overtaking maneuver can alternatively be performed fully autonomously, so that the driver is present in the motor vehicle merely as a spectator or monitor. For this case too, the driver will find it more agreeable if, during overtaking, the motor vehicle behaves in a manner in which he/she would do himself/herself during manual operation of the motor vehicle.

An aspect of the invention also relates to a driver assistance apparatus having an evaluation unit. The driver assistance apparatus or the driver assistance system is designed to carry out a method according to an aspect of the invention. The evaluation unit can be in the form of a computing unit having a processor, for example. The evaluation unit can have an internal or external memory, for example.

The driver assistance apparatus can be in the form of an overtaking assistant or overtaking proposal assistant or overtaking warning assistant, for example.

An aspect of the invention further relates to a motor vehicle having a driver assistance apparatus according to an aspect of the invention. The motor vehicle is in particular in the form of a passenger car. In particular, the motor vehicle is operable at least semi-autonomously.

Advantageous embodiments of the method according to an aspect of the invention can be considered to be advantageous embodiments of the driver assistance apparatus and of the motor vehicle. The relevant components of the driver assistance apparatus and of the motor vehicle are each designed to perform the respective method steps.

BRIEF DESCRIPTION OF THE DRAWINGS

Further features of aspects of the invention emerge from the claims, the figures and the description of the figures. The features and combinations of features mentioned in the description above and the features and combinations of features mentioned in the description of the figures below and/or shown in the figures alone can be used not only in the respectively stated combination, but also in other combinations or alone without departing from the scope of an aspect of the invention.

Exemplary embodiments of aspects of the invention will be explained in more detail below on the basis of schematic drawings.

In the drawings:

FIG. 1 shows a schematic plan view of an exemplary embodiment of a motor vehicle according to an aspect of the invention having a driver assistance apparatus and a target vehicle in one lane;

FIG. 2 shows a schematic plan view of the motor vehicle in the lane with an overtaking route;

FIG. 3 shows a schematic depiction of a driver sitting in the motor vehicle in a side view; and FIG. 4 shows a flowchart for an exemplary embodiment of a method according to an aspect of the invention for operating the driver assistance apparatus.

In the figures, identical or functionally identical elements are provided with identical reference signs.

DETAILED DESCRIPTION OF THE PREFERRED EMBODIMENTS

Figure 1:
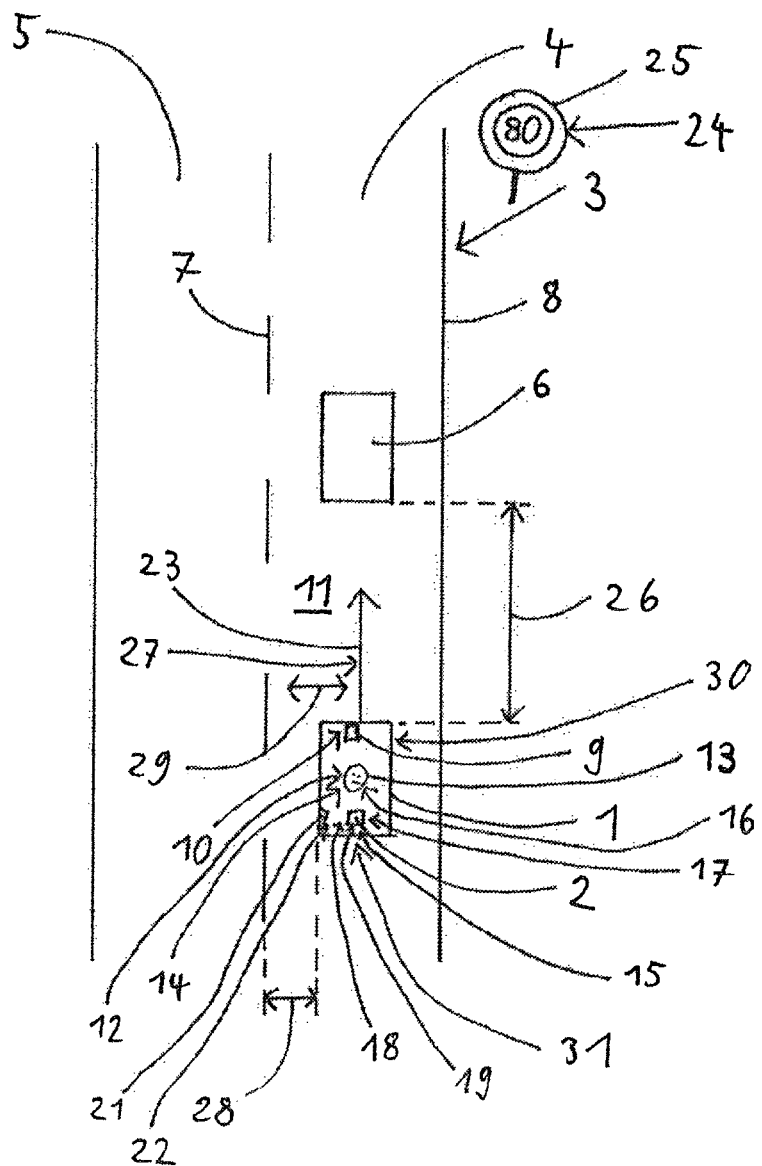

FIG. 1 shows an exemplary embodiment of a motor vehicle 1 according to an aspect of the invention having a driver assistance apparatus 2. The motor vehicle 1 is on a road 3. In accordance with the exemplary embodiment, the road 3 has a lane 4 and a further lane 5. The motor vehicle 1 is in the lane 4.

In the direction of travel in front of the motor vehicle 1 there is a target vehicle 6 in the lane 4. The target vehicle 6 can move, for example; it may also be stationary, however.

The road 3 can be part of a highway, freeway or any other road, for example, on which the target vehicle 6 can be overtaken by the motor vehicle 1. The lane 4 and the further lane 5 are separated by a road marking 7 in accordance with the exemplary embodiment. The road marking 7 is in the form of a guiding line, in particular. The sides of the lane 4 are bounded by the road marking 7 and an edge marking 8. The edge marking 8 is in the form of a road boundary, in particular.

Furthermore, the motor vehicle 1 has an ambient sensor 9. The ambient sensor 9 may be in the form of a camera, radar sensor, ultrasonic sensor, lidar sensor or laser scanner, for example. The motor vehicle 1 can also have multiple ambient sensors 9, for example. The ambient sensor 9 captures sensor data 10 from a surrounding area 11 of the motor vehicle 1. The surrounding area 11 surrounds at least part of the motor vehicle 1. The surrounding area 11 and hence also the sensor data 10 contain at least part of the target vehicle 6. The sensor data 10 can for example also be provided by means of sensor data fusion from different kinds of ambient sensors 9 of the motor vehicle 1.

Figure 3:
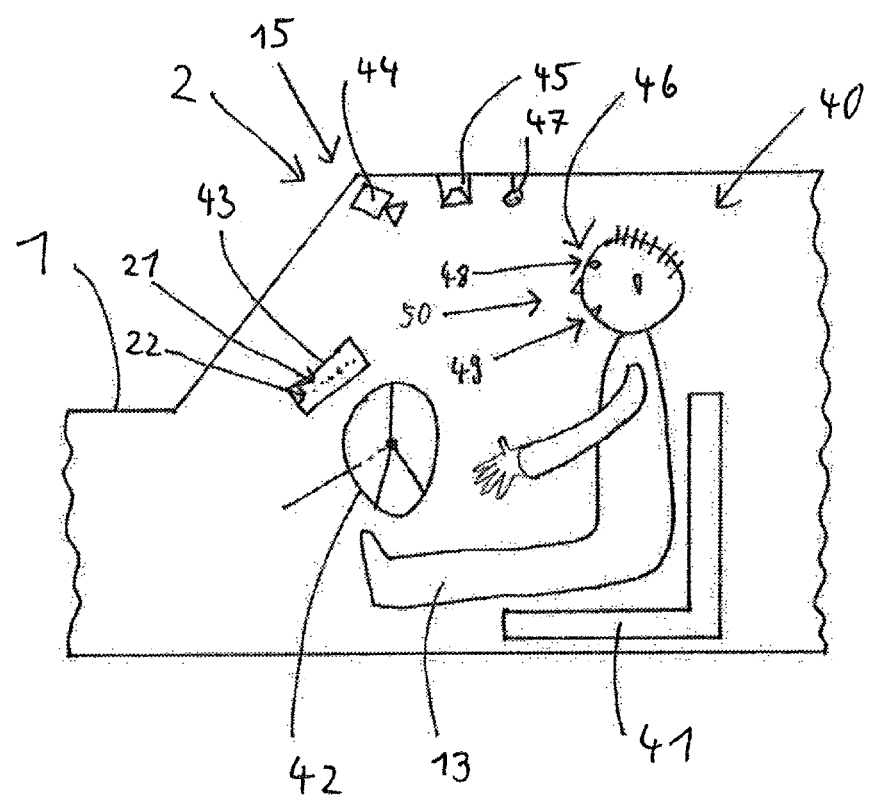

Before or after the sensor data 10 are captured, a driver characteristic 12 of a driver 13 of the motor vehicle 1 is captured—as shown in FIG. 3. The driver characteristic 12 describes the driver 13. The driver characteristic 12 can be provided for example by virtue of the driver 13 identifying himself/herself in a wide variety of ways (described later on in the text) or else by recognizing that the driver 13 is involved. This can be recognized on the basis of a characteristic driving style, for example.

The driver characteristic 12 is used to assign the driver 13 to a driver class 14. The assigning can be effected for example such that the driver is assigned to that driver class 14 in which the driver characteristic 12 has the greatest similarity to a characteristic of the respective driver class 14.

The driver class 14 classifies the driver 13 such that he/she is now categorized as for example a risk-inclined driver or else leisurely driver or else safety-conscious driver or else slow driver or else fast driver. Multiple drivers 13 can be assigned to the driver class 14, for example, which means that the driver class 14 is thus a generalization for multiple drivers 13. It may alternatively be that the driver class 14 is provided individually for the driver 13 and therefore each of the driver classes 14 has only one of the drivers 13.

The driver class 14 is then used to read in driver-class-specific overtaking information 15. In particular, each driver class has different overtaking information 15. The overtaking information 15 describes an overtaking tendency 16 of the driver 13. The driver-class-specific overtaking information 15 alternatively preferably describes an overtaking tendency of other drivers assigned to the same driver class 14 as the driver 13. The overtaking information 16 is in particular read in by the driver assistance apparatus 2. In particular, it is read in by an evaluation unit 17 of the driver assistance apparatus 2. The evaluation unit 17 has a processor and a computer-readable memory, for example.

The overtaking information 15 and the sensor data 10 are then used to select a control signal 18 of the driver assistance apparatus 2. The control signal 18 is selected from a plurality of reference control signals 19. The plurality of reference control signals 19 can be stored in the driver assistance apparatus 2, for example. The control signal 18 rates an overtaking maneuver 20 of the motor vehicle 1 in regard to the target vehicle 6. For example the overtaking information 15 and the sensor data 10 are thus used to rate whether the driver 13 intends to overtake and/or whether overtaking is possible at present or in the future.

The rating is thus performed in particular not only on the basis of the sensor data 10 but also on the basis of the driver-class-specific overtaking information 15. In the case of known overtaking assistants, the rating of the overtaking maneuver 20 is performed only on the basis of the sensor data 10. The overtaking information 15 alternatively also describes the overtaking tendency 16 of the driver 13.

The overtaking information 15 is important because every driver has different overtaking tendencies 16. One driver is more risk-inclined than another driver, for example, and one driver utilizes the power reserves of the motor vehicle 1 completely whereas another driver utilizes the power reserves only in part.

The control signal 18 is finally output by the driver assistance apparatus 2. The control signal 18 outputs overtaking opportunity advice 21 or a warning 22, in particular. The overtaking opportunity advice 21 signals to the driver 13 for example that the overtaking maneuver 20 is possible with his/her overtaking tendency 16. The warning 22 signals to the driver 13 for example that the overtaking maneuver 20 is not possible with his/her tendency 16.

The control signal 18 allows the motor vehicle 1 to perform the overtaking maneuver 20 at least semi-autonomously in addition or as an alternative to the output of the overtaking opportunity advice 21 or the warning 22, however. This means that for example an automatic steering intervention and/or automatic acceleration and deceleration can be brought about by the control signal.

The overtaking information 15 is produced in particular on the basis of training data that have a property characterizing the driver 13. The property can be a speed of travel 23 of the motor vehicle 1 relative to a mandatory speed 24, for example. The mandatory speed 24 is indicated for example on a road sign 25 arranged beside the road 3.

The property can alternatively be available as an acceleration profile, utilization of the power reserve of the motor vehicle 1, acceleration behavior, shifting behavior, braking behavior, distance behavior 26 in regard to the target vehicle 6, approach speed behavior 27 in regard to the target vehicle 6.

The property can for example also be available as a lateral distance 28 between road marking and motor vehicle 1, however. Furthermore, the property can for example also be available by virtue of a lateral driving profile 29. The lateral driving profile 29 involves the lateral distance 28 over time being recorded and taken into consideration. The lateral driving profile 29 allows for example recognition of when the driver 13 repeatedly drives up close to the road marking 7 or else briefly crosses the road marking 7 at specific intervals in order to see past the target vehicle 6.

While the motor vehicle 1 is travelling behind the target vehicle 6, an operating parameter 30 of the motor vehicle 1 is captured. The operating parameter 30 comprises the properties of the overtaking information that are currently captured while the motor vehicle 1 is travelling. A comparison of the operating parameter 30 with the overtaking information 15 then allows for example an intention 31 of the driver 13 to overtake to be recognized. This means that if the similarity between one of the operating parameters 30 and a property of the overtaking information 15 is more similar than a similarity limit value, it can be assumed that the driver 13 is pursuing the intention 31 to overtake and wishes to overtake the target vehicle 6 in the motor vehicle 1.

As a result of the recognition of the intention 31 to overtake, it is then possible for the overtaking opportunity advice 21 or else the warning 22 to be output, for example.

Figure 2:
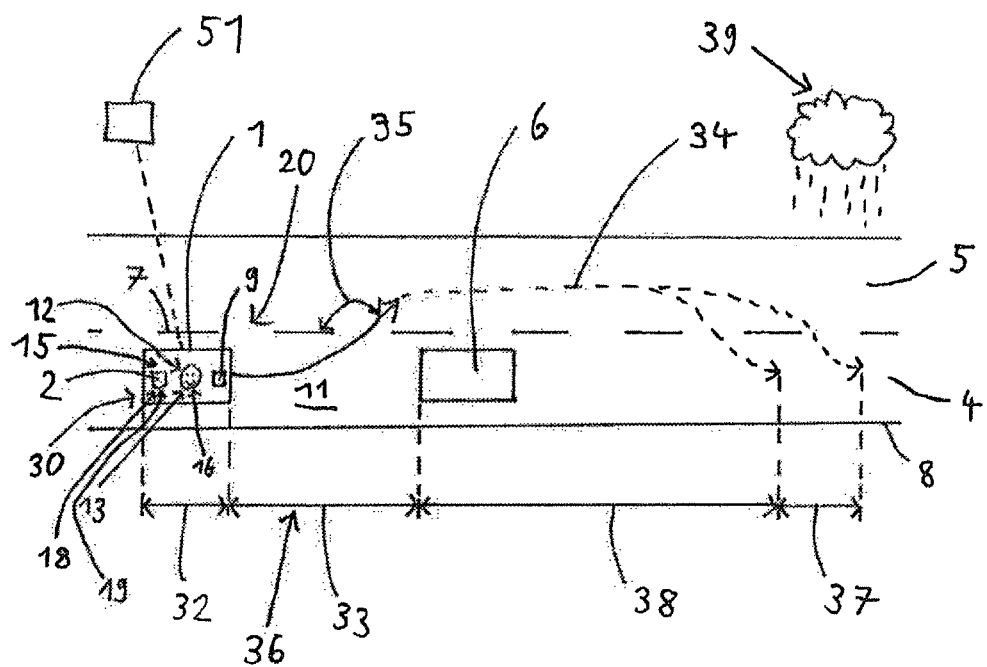

FIG. 2 shows the motor vehicle 1 analogously to FIG. 1 on the road 3 behind the target vehicle 6. The motor vehicle 1 has a vehicle length 32 and drives at a distance 33 behind the target vehicle 6. The distance 33 from the target vehicle 6, which is individually chosen by the driver 13, is likewise a property of the training data that influences the overtaking information 15.

On the basis of the overtaking information 15 and the sensor data 10, an overtaking route 34 is then determined. The overtaking route 34 in this case is the route or the travel trajectory that the motor vehicle 1 would take if it complies with the overtaking tendency 16 of the driver 13. The overtaking route 34 thus takes account of how the driver 13 would overtake the target vehicle 6 if he/she where to steer the motor vehicle 1 himself/herself, but it also takes account of how agreeable the driver 13 finds the overtaking maneuver 20 if the motor vehicle 1 is operated at least semi-autonomously. As such, it may be for example that the overtaking maneuver 20 is possible for one driver class 14, whereas the overtaking maneuver 20 is not possible for another driver class 14 if the overtaking maneuver 20 is supposed to comply with the overtaking tendency 16.

The overtaking route 34 provides further properties of the training data for the overtaking information 15.

As such, the property provided is for example a pulling-out angle 35, which describes for example the angle between road marking 7 and overtaking route 34 at the point at which the overtaking route 34 intersects the road marking 7. Furthermore, one property is provided by a pulling-out distance 36 of the motor vehicle 1 from the target vehicle 6 at the beginning of the overtaking maneuver 20. The pulling-out distance 26 is equal to the distance 33 in accordance with the exemplary embodiment of FIG. 2. Besides this, a further provided property of the training data is a safety distance 37 when pulling back in after an effected overtaking maneuver 20. The safety distance 37 is the distance voluntarily observed, so to speak, after a necessary pulling-in distance 38 when pulling in, in order to convey a feeling of safety to the target vehicle driver now travelling behind or else in order to prevent an accident if the target vehicle 6 accelerates unexpectedly. In addition or as an alternative to the safety distance 37, the property prescribed can alternatively be a pulling-in time required by the motor vehicle 1 as the property for the overtaking information 15.

The overtaking route 34 is dependent in particular on the individual acceleration profile of the driver 13, the willingness of the driver 13 to utilize power reserves of the motor vehicle 1 and the chosen speed of travel 23 in regard to the mandatory speed 24.

Furthermore, the prescribed property of the overtaking information 15 can also be a current weather condition 39, a current time of day, a current day of the week, a traffic density or a road category. It is for example also possible for a degree of brightness in the surrounding area 11 of the motor vehicle 1 to be captured and to influence the training of the overtaking information as a property of the overtaking information. As such, a driver can drive in more risk-inclined fashion in daylight than he/she drives at twilight or at night, for example.

FIG. 3 shows the motor vehicle 1 in a partial side view. In an interior 40 of the motor vehicle 1, the driver 13 sits in a seat 41. Furthermore, the motor vehicle 1 in accordance with the exemplary embodiment has a steering wheel 42, a display unit 43, an interior camera 44 and a loudspeaker 45.

The overtaking opportunity advice 21 and/or the warning 22 can be output visually and/or haptically and/or audibly in the interior 40 of the motor vehicle 1. As such, the output can be effected for example by means of a vibration of the seat 41, a vibration of the steering wheel 42, a display by the display unit 43 or an audible output by the loudspeaker 45. The output of the overtaking opportunity advice 21 and of the warning is more than a reproduction of information and comprises the application of voltage to the seat 41 or an actuator of the seat 41 and/or to the steering wheel 42 or an actuator of the steering wheel 42 for the purpose of vibration and/or the application of voltage to the display unit 43 for the purpose of activation of pixels or light-emitting diodes.

In accordance with a further exemplary embodiment, a currently physiologically recognizable identifier 46 of the driver 13 is captured. The identifier 46 may be prescribed for example as nervousness, eye movement, shouting, sweating or other characteristic actions. The physiologically recognizable identifier 46 is a behavior relating to the body of the driver 13. The identifier 46 can likewise be trained in the manner of the overtaking information 15. On the basis of a comparison of the identifier 46 with a plurality of reference identifiers, the intention 31 of the driver 13 to overtake is recognized.

The identifier 46 can be captured for example using the interior camera 44, a microphone 47 or a pulse or breathing rate measuring instrument, not depicted further, or a perspiration measuring instrument, likewise not depicted further.

The identifier 46 is thus in particular a degree of nervousness 47 of the driver 13 and/or an eye movement 48 of the driver 13 and/or a sound 49 uttered by the driver 13. It is alternatively possible for a semantic meaning of the sound 49 uttered by the driver 13 to be captured. As such, for example a remark by the driver 13 can be recognized as a swearword by means of a voice recognition program of the driver assistance apparatus 2.

The degree of nervousness 50 can be recognized on the basis of the breathing rate, for example.

The driver characteristic 12 can be captured for example by the interior camera 44, the microphone 47, a seat adjustment of the seat 41, a radio receiver or a fingerprint reader. The driver characteristic 12 may alternatively be the driving style of the driver 13 himself/herself or else a characteristic actuation of an operator control element of the motor vehicle 1, in particular a turn signal lever, an accelerator pedal or a brake pedal.

Figure 4:
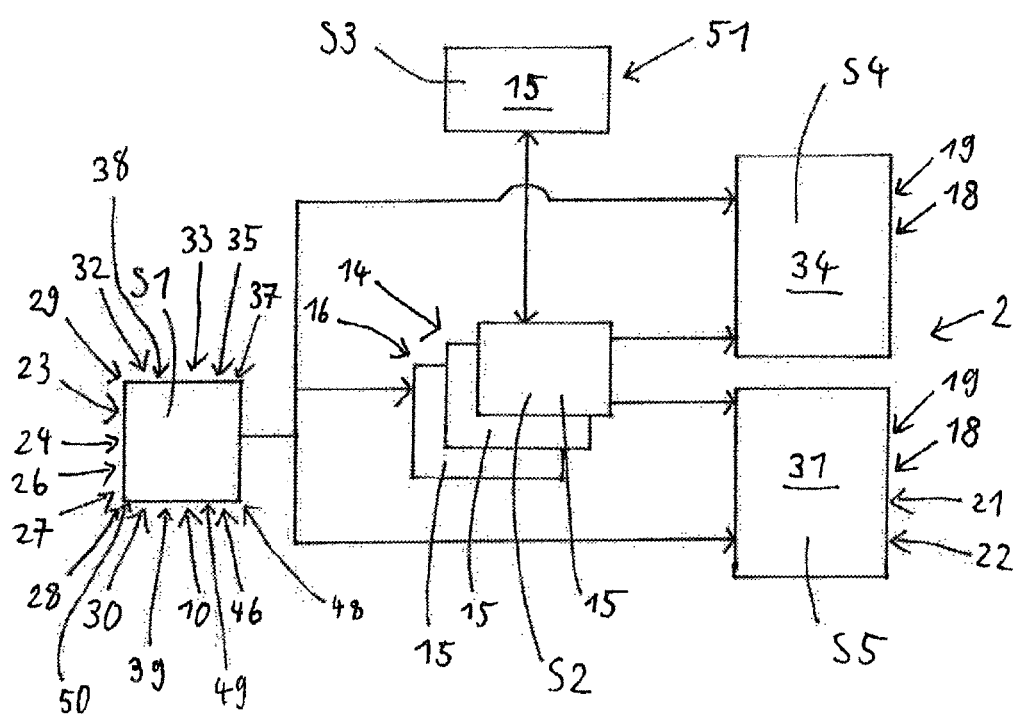

FIG. 4 shows a flowchart for the method. The steps that now follow can be carried out in varied order. In a step S1, the sensor data 10 and the operating parameters 30 are captured. In general terms, vehicle data, vehicle signals, sensor data and for example also backend data are thus received from a vehicle-external server. In a step S2, the overtaking information 15 is trained or learned or analyzed. In a step S3, the overtaking information 15 can then be provided. The overtaking information 15 can for example also be transferred from the motor vehicle 1 to a motor-vehicle-external device 51. In particular, the overtaking information is transferred to the motor-vehicle-external device 51 if said overtaking information is adapted during the operation of the motor vehicle 1 on the basis of currently captured properties, for example properties that the operating parameters 30 contain. The motor-vehicle-external device 51 can then send the overtaking information 15 to further motor vehicles, for example. The motor-vehicle-external device 51 is thus available as a computer cloud, for example, which can be available in stationary, distributed or central fashion, for example.

In a step S4, the individual overtaking route 34 is calculated. In a step S5, the intention 31 to overtake is recognized.

The overtaking information 15 is preferably trained using methods of machine learning and artificial intelligence, in particular using neural networks, SVM (support vector machine) methods, deep learning, KNN (k-nearest-neighbor) or regression. The training can take place within the motor vehicle 1 or else in the vehicle-external device 51, for example.

The further input variables taken into consideration for calculating the overtaking route 34 are for example the weight of the motor vehicle 1, the motorization of the motor vehicle 1 and the physical resistances of the motor vehicle 1.

The overtaking information 15 may be stored for example in a portable vehicle key or, as already mentioned, in the vehicle-external device 51, so that the driver 13 can take the overtaking information with him/her when changing vehicle, for example when changing to a rental vehicle. Preferably, the overtaking information 15 is also abstracted by the driver class 14 such that transfer to different vehicles, for example with different equipment, in particular motorization, is possible.

Furthermore, there is provision for the adapted overtaking information 15 to be transferred from multiple motor vehicles, as swarm data as it were, to the vehicle-external device 51 in order to be distributed to further motor vehicles from there. This allows future first-time learning by other drivers to be speeded up, for example.

LIST OF REFERENCE SIGNS

1 Motor vehicle
2 Driver assistance apparatus
3 Road
4 Lane
5 Further lane
6 Target vehicle
7 Road marking
8 Edge marking
9 Ambient sensor
10 Sensor data
11 Surrounding area
12 Driver characteristic
13 Driver
14 Driver class
15 Overtaking information
16 Overtaking tendency
17 Evaluation unit
18 Control signal
19 Plurality of reference control signals
20 Overtaking maneuver
21 Overtaking opportunity advice
22 Warning
23 Speed of travel
24 Mandatory speed
25 Road sign
26 Distance behavior
27 Approach speed behavior
28 Lateral distance
29 Lateral driving profile
30 Operating parameter
31 Intention to overtake
32 Vehicle length
33 Distance
34 Overtaking route
35 Pulling-out angle
36 Pulling-out distance
37 Safety distance
38 Necessary pulling-in distance
39 Weather condition
40 Interior
41 Seat
42 Steering wheel
43 Display unit
44 Interior camera
45 Loudspeaker
46 Identifier
47 Microphone
48 Eye movement
49 Sound
50 Degree of nervousness
51 Motor-vehicle-external device

The invention claimed is:

1. A method for operating a driver assistance apparatus of a motor vehicle, comprising:
capturing sensor data of a surrounding area of the motor vehicle in which at least one target vehicle is situated, said target vehicle being in front of the motor vehicle and in a same lane;
capturing at least one driver characteristic describing a driver of the motor vehicle;
assigning the driver to a predetermined driver class of a plurality of predetermined driver classes on the basis of the driver characteristic, each of the plurality of predetermined driver classes indicating respective driving behavior of other drivers based on previously captured driver characteristics that are similar between the other drivers;
reading in driver-class-specific overtaking information associated with the predetermined driver class, the driver-class-specific overtaking information describing an overtaking tendency of the other drivers in the predetermined driver class;
selecting a control signal of the driver assistance apparatus from a plurality of reference control signals associated with the driver-class-specific overtaking information and based on the sensor data, the control signal rates an overtaking maneuver of the motor vehicle in regard to the target vehicle; and
outputting the control signal by the driver assistance apparatus, the output control signal providing feedback the driver or autonomous control of the vehicle with respect to the overtaking maneuver.

2. The method as claimed in claim 1, wherein
the driver-class-specific overtaking information is produced on the basis of training data, with at least one of the following properties that characterize the driver: speed of travel relative to a mandatory speed, safety distance when pulling back in after an effected overtaking maneuver or distance from the target vehicle when pulling out before an effected overtaking maneuver.

3. The method as claimed in claim 1, wherein
the driver-class-specific overtaking information is produced on the basis of at least one of a current weather condition, a current time of day, or a current day of the week.

4. The method as claimed in claim 1, wherein
at least one current operating parameter of the motor vehicle is captured and the operating parameter and the driver-class-specific overtaking information are used to recognize an intention of the driver to overtake, and the control signal is selected on the basis of the recognized intention to overtake.

5. The method as claimed in claim 1, wherein
a currently physiologically recognizable identifier of the driver is captured and the identifier is compared with a plurality of reference identifiers, wherein the comparison is used to recognize an intention of the driver to overtake.

6. The method as claimed in claim 5, wherein
the currently physiologically recognizable identifier captured is a degree of nervousness and/or an eye movement and/or a volume of a sound uttered by the driver and/or a semantic meaning of a sound uttered by the driver.

7. The method as claimed in claim 5, wherein
the sensor data and the driver-class-specific overtaking information and/or the physiologically recognizable identifier are taken as a basis for determining an individual overtaking route for the overtaking maneuver in regard to the target vehicle.

8. The method as claimed in claim 1, wherein
the driver-class-specific overtaking information is adapted on the basis of current vehicle driving by the driver during the operation of the motor vehicle.

9. The method as claimed in claim 8, wherein
the driver-class-specific overtaking information adapted during the operation of the motor vehicle is transferred to at least one motor-vehicle-external device.

10. The method as claimed in claim 1, wherein
the control signal is used by the driver assistance apparatus to output overtaking opportunity advice or a warning of the overtaking maneuver of the motor vehicle in regard to the target vehicle.

11. The method as claimed in claim 1, wherein
the overtaking maneuver of the motor vehicle in regard to the target vehicle is performed at least semi-autonomously on the basis of the control signal.

12. The method as claimed in claim 1, wherein the driver-class-specific overtaking information is produced on the basis of at least one of a current weather condition, a current time of day, or a current day of the week.

13. The method as claimed in claim 6, wherein the sensor data and the driver-class-specific overtaking information and/or the physiologically recognizable identifier are taken as a basis for determining an individual overtaking route for the overtaking maneuver in regard to the target vehicle.

14. A driver assistance apparatus having an evaluation unit designed to carry out a method as claimed in claim 1.

15. A motor vehicle having a driver assistance apparatus as claimed in claim 14.

* * * * *